United States Patent [19]
Arai

[11] Patent Number: 5,684,630
[45] Date of Patent: Nov. 4, 1997

[54] POLARIZATION CONVERTER

[75] Inventor: Takayuki Arai, Kasukabe, Japan

[73] Assignee: Enplas Corporation, Kawaguchi, Japan

[21] Appl. No.: 402,483

[22] Filed: Mar. 10, 1995

[30] Foreign Application Priority Data

Mar. 14, 1994 [JP] Japan .................................. 6-069089

[51] Int. Cl.$^6$ ...................................................... G02B 5/30
[52] U.S. Cl. .......................... 359/487; 359/495; 359/496; 359/834
[58] Field of Search ..................................... 359/487, 495, 359/496, 634, 636, 638, 834, 837

[56] References Cited

U.S. PATENT DOCUMENTS

| | | | |
|---|---|---|---|
| 1,320,625 | 11/1919 | Kunz | 359/638 |
| 4,191,477 | 3/1980 | Schick | 359/638 |
| 4,667,961 | 5/1987 | Abu-Shumays et al. | 273/153 S |
| 4,834,499 | 5/1989 | Kaiser | 359/834 |
| 5,471,348 | 11/1995 | Miller et al. | 359/834 |

Primary Examiner—Timothy P. Callahan
Assistant Examiner—Jung Ho Kim
Attorney, Agent, or Firm—Staas & Halsey

[57] ABSTRACT

A polarization converter P free from any particular limitation in the polarization direction of incident light or wavelength dependence, and large in the degree of freedom of selection of material is composed of polarization conversion unit P1, its united block, or combination or the like. P1 is composed of blocks of one body shape uniting three triangular columnar volume region elements having both ends in right-angled isosceles triangular form so that axial directions of triangular columns corresponding to the elements respectively may be directed in three mutually orthogonal directions. When a linear polarized light L enters vertically to surface 1a, its propagation route is in the sequence of incident point Q→total reflection point R1→total reflection point R2→total reflection point R3→exit point Q'. The incident ray L and exit ray L' are parallel to each other. The polarization direction is preserved at point R1, but is converted 90° at R2, and preserved at R3 to be emitted out as L'. The polarization direction of L' is orthogonal to the polarization direction of L. Whichever the polarization direction of L may be, similar polarization conversion action is exhibited. Multiple polarization conversion units P1 or united blocks are optically and mechanically coupled with a thin substrate region made of optical material, and a polarization converter of sheet form is presented (Representative drawing) FIG. 1.

11 Claims, 6 Drawing Sheets

POLARIZATION CONVERTER

BACKGROUND ART

1. Technical Field

The present invention relates to a polarization converter possessing a function of converting the polarization direction of incident light by 90°, and more particularly to a polarization converter possessing a function of making a U-turn after converting the polarization direction of incident light by 90°.

2. Description of the Related Art

A polarization converter is known as one of the function elements used in the optical field. It is an element having a function for converting the polarization of incident light by 90°. As such function element, a phase difference plate (half wavelength plate) using a birefringent material is known. Using one side of such phase difference plate as reflection surface, it is possible to obtain a polarization converter having a function of emitting a reflected light in a form of making a U-turn after converting the polarization direction of incident light by 90°.

When performing polarization conversion by using such phase difference plate, there is a limitation that the angle formed between the polarization direction of incident light (assuming a linear polarized component) and the principal section of the phase difference plate must be 45°. Besides, the phase difference plate has its optimum wavelength determined by the optical path length in the thicknesswise direction, and it is difficult, in its principle, to exhibit a favorable performance to the light having a different wavelength or the light having a spread in wavelength.

Moreover, the variety of materials for composing the element is limited, and it is hard to use general optical materials (optical glass, transparent plastics, etc.).

OBJECTS AND SUMMARY OF THE INVENTION

The invention is intended to solve the problems of the prior art. It is an object of the invention to present a polarization converter free from any particular restriction in the polarization direction of incident like, unlike the conventional phase difference plate. It is other object of the invention to present a polarization converter based on a novel principle, liberated from the problems of waveform dependence and narrowness of material selection.

A polarization converter conforming to the invention comprises a compound prism region in one body shape sequentially uniting three triangular columnar volume region elements having both ends in right-angled isosceles triangular form so that axial directions of triangular columns corresponding to the elements respectively may be directed in three mutually orthogonal directions.

According to the invention, moreover, various forms of polarization converter comprising the above constitution as a basic unit are presented. Examples may include the following.

An example comprises at least one compound prism region in one body shape sequentially uniting three triangular columnar volume region elements having both ends in right-angled isosceles triangular form so that axial directions of triangular columns corresponding to the elements respectively may be directed in three mutually orthogonal directions, and a substrate region made of optical material coupled with at least one compound prism region optically and mechanically.

Another example comprises a compound prism region in one body shape coupling parallel a plurality of unit volume regions, of which unit volume region is a volume region having one body shape sequentially uniting three triangular columnar volume region elements having both ends in right-angled isosceles triangular form so that axial directions of triangular columns corresponding to the elements respectively may be directed in three mutually orthogonal directions.

Still another example comprises at least one compound prism region in one body shape coupling parallel a plurality of unit volume regions, of which unit volume region is a volume region having one body shape sequentially uniting three triangular columnar volume region elements having both ends in right-angled isosceles triangular form so that axial directions of triangular columns corresponding to the elements respectively may be directed in three mutually orthogonal directions, and a substrate region made of optical material coupled with at least one compound prism region optically and mechanically.

A different example comprises multiple volume regions having one body shape sequentially uniting three triangular columnar volume region elements having both ends in right-angled isosceles triangular form so that axial directions of triangular columns corresponding to the elements respectively may be directed in three mutually orthogonal directions, or multiple compound prism regions having one body shape parallel coupling a plurality of such volume regions, in a shape distributed and arrayed on the repetitive slope on one of the surface and back sides of a substrate region made of an optical material forming repetitive slopes on both surface and back sides, wherein the arrayed compound prism regions are coupled with the substrate region optically and mechanically.

A further different example comprises multiple volume regions having one body shape sequentially uniting three triangular columnar volume region elements having both ends in right-angled isosceles triangular form so that axial directions of triangular columns corresponding to the elements respectively may be directed in three mutually orthogonal directions, or multiple compound prism regions having one body shape parallel coupling a plurality of such volume regions, in a shape distributed and arrayed on the repetitive slope on one of the surface and back sides of a substrate region made of an optical material forming repetitive slopes on one side of surface and back sides and a flat plane on the other side, wherein the arrayed compound prism regions are coupled with the substrate region optically and mechanically.

In the invention, triangular columnar quadrature prisms made of optical material are sequentially coupled so that the axial directions of each triangular column may be directed in three mutually orthogonal directions to compose a compound prism region in one body shape. By forming a deflection optical path including three total reflections in the inside, an exit light converting the polarization direction of incident ray by 90° is taken out. By making use of this principle, various forms of polarization converter are presented.

A basic form of polarization converter of the invention is composed of a single polarization conversion unit. This polarization conversion unit is a constituent element commonly contained in all embodiments described below including this example.

This polarization conversion unit has a volume region made of optical material of one body shape uniting three triangular columnar right-angled isosceles triangular prisms so that the axial directions of each triangular column may be directed in three mutually orthogonal directions. As the optical material for composing such compound prism, optical materials such as light permeable plastic materials (acrylic resins, etc.) and optical glass can be used.

The refractive index of the material is practically in a range of about 1.4142 (the incident angle of the inner side giving the total reflection condition to air being 45°) to 2.0, and most of ordinary optical materials satisfy this condition.

The polarization converter of the invention has a surface effectively performing polarization conversion on input light (effective surface), and a surface not performing polarization conversion effectively on input light (noneffective surface). The latter may be provided with reflectivity. The rate of the effective surface in the entire incident surface of the polarization conversion unit may be 80%, and the rate of the noneffective surface, 20%.

In the invention, it is proposed to compose a polarization converter relatively small in the size of thickness by disposing parallel a plurality of polarization conversion units in various forms. As a result, the effective surface of the polarization conversion units for composing the polarization converter may be utilized in a set integration. As a result, also on an incident light flux of wide sectional area, the polarization conversion action is exhibited at a high efficiency.

When a plurality of polarization conversion units are arranged parallel in multiple rows, due to restriction in shape, a portion not occupied by either effective surface or noneffective surface occurs (blank portion). At the front side of the blank portion (the inlet side as seen from the light incident side) or on the bottom (the outlet side as seen from the light incident side), a reflector film may be disposed to form a reflective blank portion.

When disposing a plurality of polarization conversion units in plural parallel rows, they may be individually arrayed, or several (for example, four or more) polarization conversion units may be combined into a block (hereinafter called a united block). These united blocks may be arranged in multiple parallel rows.

Furthermore, when arraying these polarization conversion units or united blocks, the effective surfaces of the polarization conversion units may be mounted on a same plane, or distributed and located on plural mutually parallel planes. According to the latter manner, it constitutes a polarization converter having multiple effective surfaces directed in a direction inclined to an extending direction of the polarization converter.

In any arrangement herein, commonly, the polarization conversion action of the polarization converter is based on the polarization conversion action of the polarization conversion unit.

From the viewpoint of mechanical strength or manufacturing process (A typical method of manufacturing is injection molding of plastic materials.), single or plural polarization conversion units or united blocks should be preferably coupled to the substrate region composed of optical material optically and mechanically. The substrate region is, usually, made of a flat plate or sheet on the whole. The (geometrical) boundary surface of the substrate region and polarization conversion unit corresponding portion may not be always mounted on one flat plane. Or, having an inclined relation with the extending plane of the polarization converter defined by the entire extending direction of the substrate region, it may be also constituted so apply a polarization conversion action on the light entering the extending plane of the polarization converter at an inclined angle.

Referring now to the accompanying drawings, preferred embodiments of the invention are described in detail below.

BRIEF DESCRIPTION OF THE DRAWINGS

FIGS. 3a and 3b show an embodiment of realizing a polarization converter by binding a plurality (four, herein) of the polarization conversion unit shown in FIG. 1 to form a unit, and coupling multiple units with a substrate, in which FIG. 3a show a schematic sectional structure of the entire polarization converter, and FIG. 3b is a see-through perspective view of the polarization conversion unit formed on the back surface of the substrate as seen from the substrate surface side.

FIGS. 4a and 4b show an embodiment in which the polarization conversion unit formation region P'1 shown in FIGS. 3a and 3b is given by uniting multiple blocks P4 each composed of four polarization conversion units.

FIGS. 5a and 5b are a symbolized expression of the undulated pattern of the polarization conversion unit formation region, in which FIG. 5a is a symbolized expression of the undulated pattern of the polarization conversion unit formation region shown in FIG. 4b and FIG. 5b explains the arrows and other symbols used in the diagram.

FIGS. 7a and 7b show two embodiments having the light incident and exit directions taken in directions inclined to the extending direction of the polarization converter.

DETAILED DESCRIPTION OF THE PREFERRED EMBODIMENTS

Figure 1:
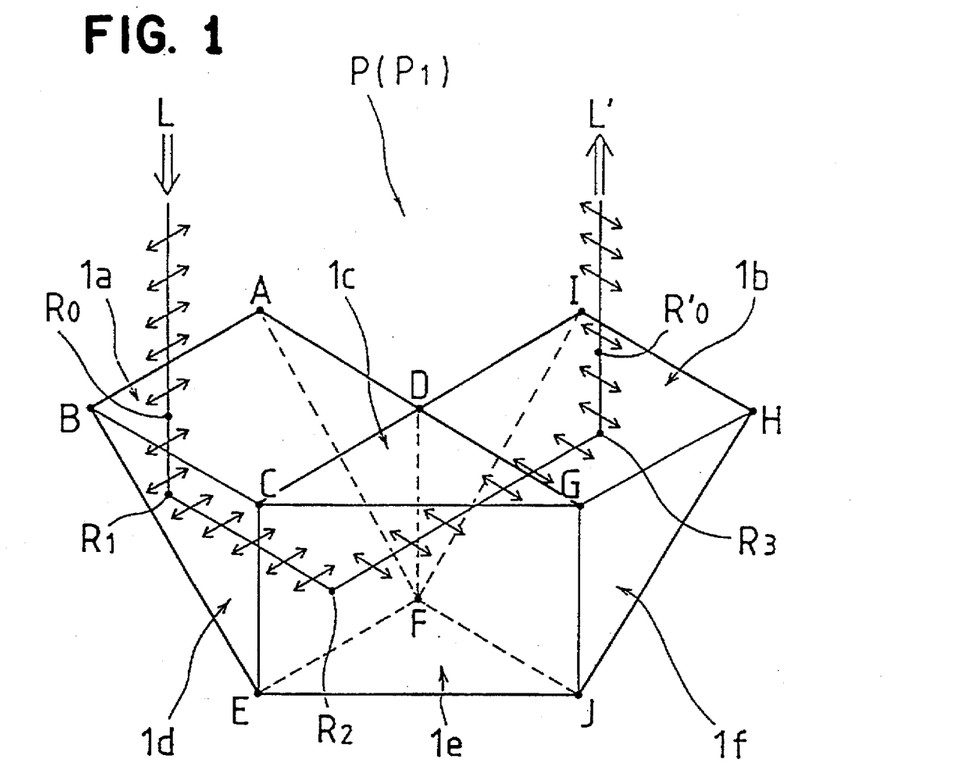
FIG. 1 is a perspective view showing a basic form of a polarization converter according to the invention.

Referring to FIG. 1, a perspective view of a basic form of polarization converter of the invention is shown. In the diagram, reference code P denotes a polarization converter, and herein it is given as a single polarization conversion unit P1. This polarization conversion unit P1 is a fundamental constituent element of the polarization converter of the invention, and is a constituent element commonly contained in all embodiments mentioned below including this example.

This polarization conversion unit P1 possesses, as shown in the drawing, a volume region composed of optical material of one body shape uniting three triangular columnar right-angled isosceles triangular prisms ABCDEF, DCGEFJ, DGHIFJ so that the axial directions of each triangular column is directed in three directions orthogonal to each other.

The optical material for composing such compound prism may be light permeable plastic material (acrylic resin, etc.), optical glass, or the like, and considering the ease of processing of material, the former material is preferred.

The refractive index of the material is practical in a range of about 1.4142 (inside incident angle for giving the total reflection condition to the air is 45°) to 2.0, and most of ordinary optical materials satisfy this condition.

The polarization conversion unit P1 thus composed of such compound prisms has the following action. Suppose a linear polarized light L having an electric field vector oscillation surface in a direction parallel to side AB as indicated by small arrow enters vertically to the square surface region ABCD (surface 1a). The propagation route of ray L is in the sequence of incident point R0 to surface 1a→total reflection point R1 on surface 1d→total reflection point R2 on surface 1e→total reflection point R3 on surface 1f→exit point R'0 from surface 1b. The incident ray L and exit ray L' are in a parallel direction (reverse in propagation direction).

The polarization direction is preserved at the total reflection point R1, but is converted 90° to a direction parallel to side HI at R2. At R3, the converted state is preserved, and is emitted as ray L'. As a result, the polarization direction of the exit ray L' is shifted 90° from the polarization direction of incident ray L.

Similarly, when the polarization direction of the incident ray L is vertical to AB, the polarization direction of the exit ray L' is converted vertical to side HI, that is, parallel to side AB. Accordingly, from the principle of overlapping, it is understood that the polarization conversion unit P1 has an action for converting the polarization direction by 90° regardless of the condition of polarization direction.

The incident region in which such polarization conversion action is exhibited is the surface 1a enclosed by ABCD. Besides, when the light propagation direction is reverse, the surface 1b enclosed by IDGH presents an equivalent incident surface to 1a. Hereinafter, these two surfaces 1a, 1b, or corresponding surfaces are called "effective surfaces."

By contrast, when light enters vertically to a triangular surface 1c enclosed by points CDG, the light mostly transmits parallel to the axial directions of the triangular column CDGEFJ, and it does not contribute to polarization conversion action. This surface 1c or other surfaces equivalent to it is called a "noneffective surface." By forming a reflective film on this transmission surface, a reflective noneffective surface may be formed.

The rate of the effective surface on the whole incident surface ABCGHID of the polarization conversion unit P1 may be 80%, and the rate of the noneffective surface may be 20%. If a linear polarized parallel light flux having a section similar to the incident surface ABCGHID enters vertically to the polarization conversion unit P1, the polarization direction is converted in 80% thereof.

If the sectional area of the incident light flux is wide, a conversion efficiency of nearly 100% may be realized by increasing the area of the effective surface, but, in such a case, the thickness of the polarization converter (the length of sides CE, GJ) also increases.

In other modes of the invention, a plurality of polarization conversion units P1 are arranged in various forms, and polarization converters relatively small in thickness are composed. In such modes, the effective surface of each polarization conversion unit P1 for composing the polarization converter is utilized in set integration. As a result, the polarization conversion action is exhibited at high efficiency in the incident light flux of wide sectional area.

When multiple polarization conversion units P1 are disposed parallel, an area not occupied by either effective surface or noneffective surface is formed due to the restrictions in shape. This area is called a "blank area". By forming a reflective film at the front (inlet side as seen from the light incident side) or at the bottom (outlet side as seen from the light incident side) of the blank area, a reflective blank area may be formed.

When forming a plurality of polarization conversion units P1 in plural rows, they may be formed either individually, or in united block of several (for example, four or more) polarization conversion units P1 (hereinafter called united block). Or the united blocks may be disposed in multiple rows.

Furthermore, when arranging these polarization conversion blocks P1 or united blocks parallel, two forms may be employed, that is, in a first form, the polarization conversion units P1 are arranged so that their effective surfaces may be mounted on a common plane, and in a second form, the effective surfaces of the polarization conversion units P1 are distributed on plural mutually parallel slopes. In the latter form, a polarization converter having multiple effective surface directed to a inclination direction to the extending direction of the polarization conversion elements is provided.

From a practical viewpoint of mechanical strength and manufacturing process (A typical method of manufacturing is injection molding of plastic materials.), it is preferred that the multiple polarization conversion units P1 or united blocks be coupled optically and mechanically with a substrate region composed of optical material. For this purpose, uniting without boundary by injection forming, and adhering by transparent adhesive may be applied.

The substrate region is generally in a form of flat plate or sheet on the whole. However, the (geometrical) boundary surface of the substrate region and the polarization conversion unit corresponding portion may not be always mounted on a flat plane. Having a relation inclined to the extended flat plane of the polarization converter defined in the entire extending direction of the substrate region, it may be disposed to have polarization conversion action on the light entering at an inclined angle to the extending flat plane of the polarization converter.

Referring also to FIGS. 2 to 7 successively, embodiments of using a plurality of polarization conversion units P1 are described below.

Figure 2:
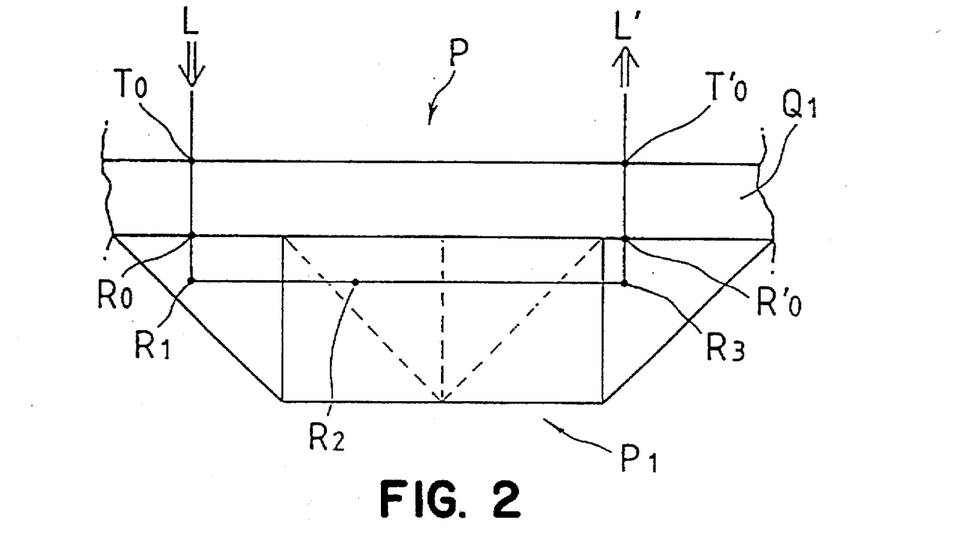
FIG. 2 is a sectional view of an embodiment of realizing a polarization converter by coupling a substrate region to the constitution of the basic form shown in FIG. 1.

FIG. 2 is a sectional view of an embodiment of a polarization converter realized by coupling a substrate region to a polarization conversion unit composed of compound prisms. The polarization converter P has a single polarization conversion unit P1 coupled to the back surface side (the light exit side, the same hereinafter) of the substrate region Q1. The structure and action of the polarization conversion unit P1 are the same as shown in FIG. 1. Incidentally, the portions corresponding to surfaces 1a to 1c in FIG. 1 are the boundary surface with the substrate region Q1. On this boundary surface, the both are coupled optically and mechanically.

A typical method of coupling the two optically and mechanically is to compose the entire polarization converter P as one body. In this case, the boundary of the two exists only in its geometrical meaning.

The action of such polarization converter P is as follows. When linear polarized light L enters vertically to the substrate surface corresponding to the surface 1a of the polarization conversion unit P1, the propagation route is in the sequence of substrate incident point T0→incident corresponding point R0 to surface 1a→total reflection point R1 on surface 1d→total reflection point R2 on surface 1e→total reflection point R3 on surface 1f→exit corresponding point R'0 from surface 1b→substrate exit point T'0. The propagation direction of incident ray L and exit ray L' are parallel and reverse to each other. Since the substrate region Q1 has no action on the polarized state of the ray, the polarization directions of rays L, L' are orthogonal to each other.

Figures 3A, 3B:
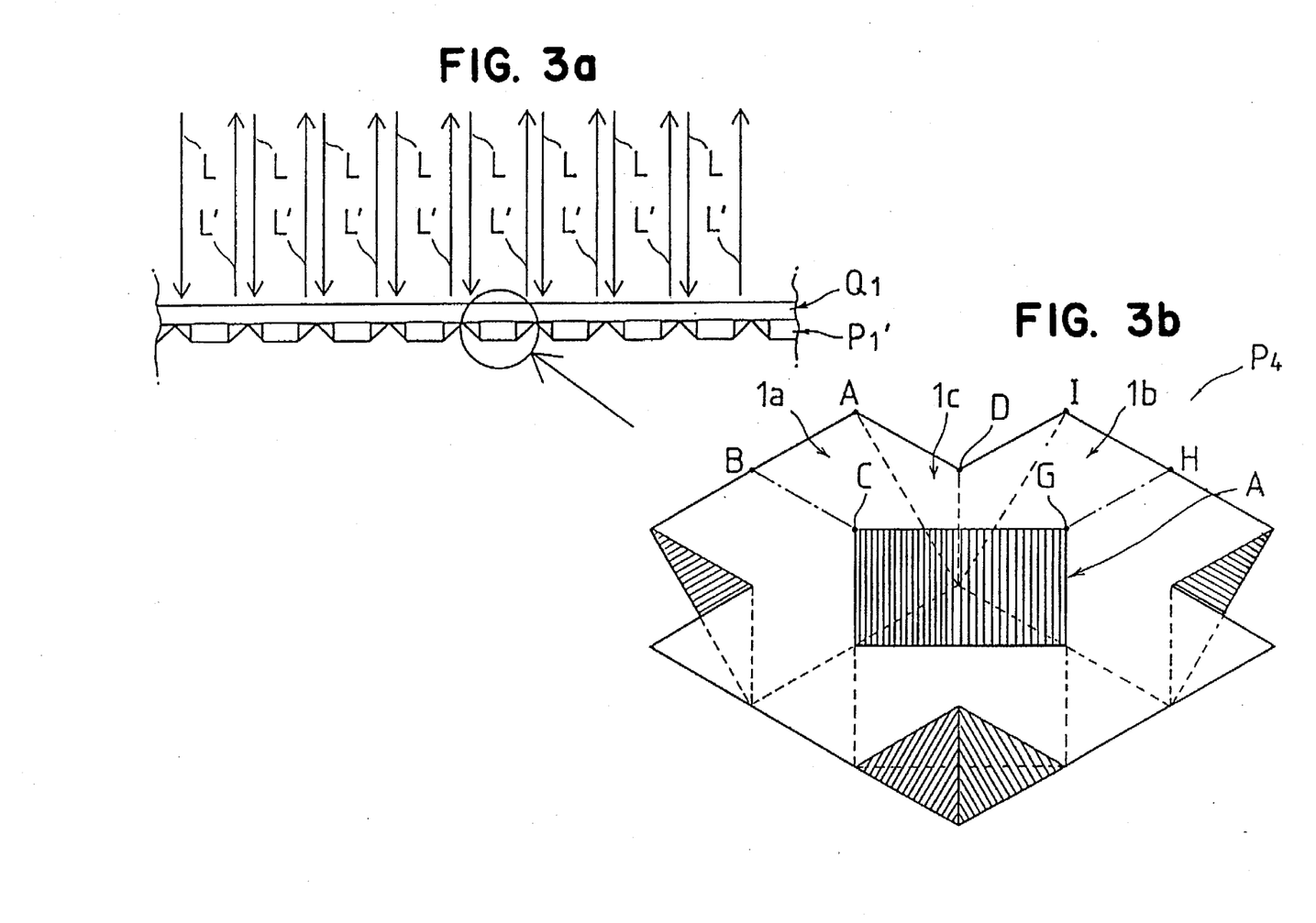

FIGS. 3a and 3b shows an embodiment of a polarization converter realized by coupling a plurality of units to a substrate by using each unit combining a plurality (four, in this example) of polarization conversion units. FIG. 3a shows a schematic sectional structure of the entire polarization converter, and FIG. 3b is a see-through perspective view of the polarization conversion unit formed on the back surface of the substrate as seen from the substrate surface side.

As shown in FIG. 3a, the entire polarization converter P is composed of substrate region Q1 and polarization conversion unit formation region P'1. The polarization conversion unit formation region P'1 is constituted by arraying and distributing united blocks P4 of polarization conversion units shown in FIG. 3b on the back surface side of the substrate region Q1. The united block P4 has four polarization conversion units united radially, with a square hole A provided in the center.

As for optical and mechanical coupling of the surfaces of each polarization conversion unit corresponding to surfaces 1a to 1c with the substrate region Q1, it is preferred that the same integration be applied, and ultimately it is preferred that the polarization converter P be united by using a same optical material. Such uniting may be easily realized by applying the technique of manufacturing the polarization converter P by injection molding by using one transparent plastic material (acrylic resin, etc.).

The light incident and exit surfaces of each polarization conversion unit (surfaces corresponding to 1a to 1c) are on a same plane, and therefore when a linear polarized light flux enters vertically to the extending direction of the polarization converter P, as shown in FIG. 3a, it is emitted as the light flux L' converted in the polarization direction by 90° in the U-turn route of substrate→polarization conversion unit→substrate.

In this embodiment, the bottom of the hole A is given in the back surface of the substrate region and when a reflective film is formed in this area, the quantity of light passing through the polarization converter P is decreased, and it can be returned to the surface side of the polarization converter P. Depending on applications, moreover, a black film may be formed in the bottom of the hole A to be used as light trap.

The back surface of the noneffective surface 1c may be similarly selected. Such modified forms of the hole or the constitution of the back surface of the polarization converter may be similarly allowed in the subsequent embodiments. In the following embodiments, therefore, repeated description about this is omitted.

Figure 4A:
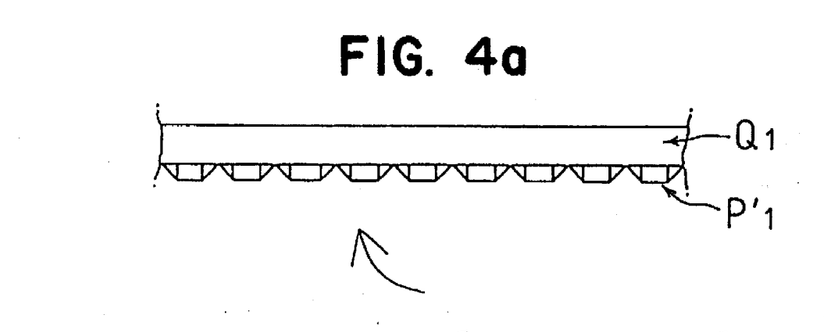
In FIG. 4a is shown a schematic sectional structure of the entire polarization converter, and in FIG. 4b is shown a perspective view of part of the polarization conversion unit formation region P'1 formed on the back surface of the substrate as seen from the substrate back side.
Figure 4B:
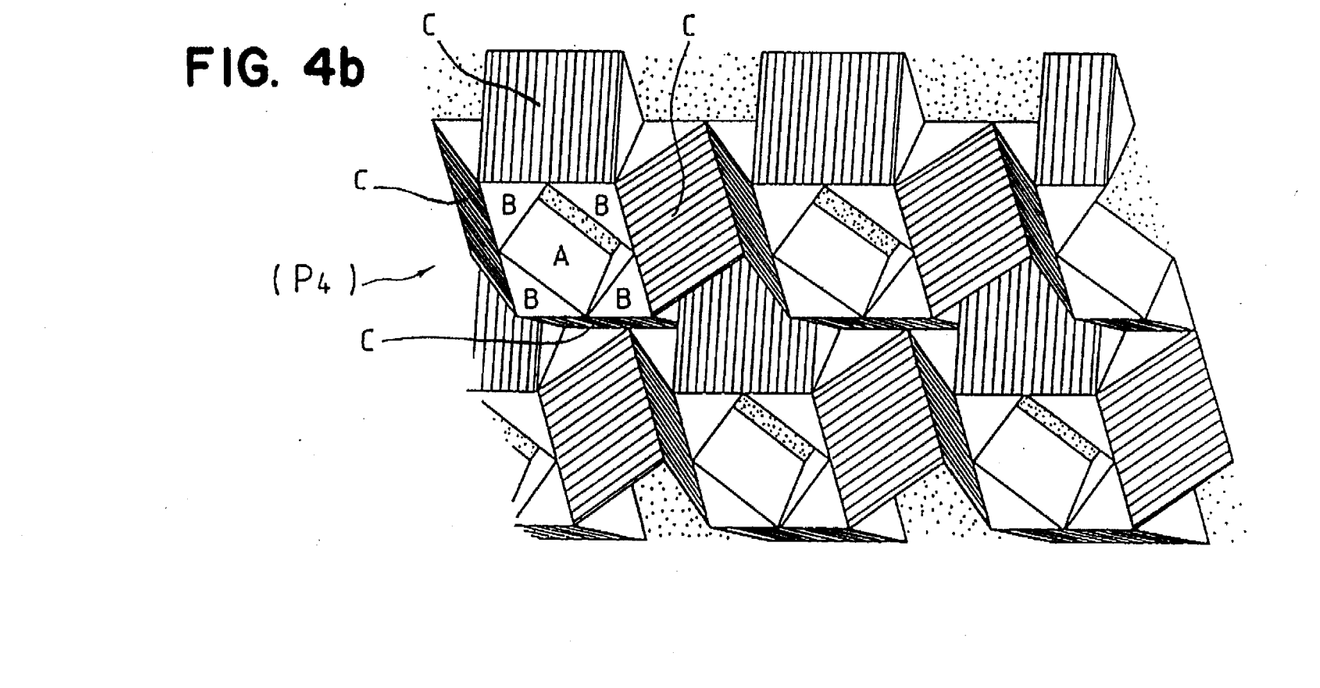

FIGS. 4a and 4b shows an embodiment in which the polarization conversion unit formation region P'1 shown in FIG. 3a is given by uniting multiple blocks P4 each composed of four polarization conversion units, instead of arranging in multiple rows. FIG. 4a shows a schematic sectional structure of the entire polarization converter, and 4b is a perspective view of appearance (undulated pattern) of part of the polarization conversion unit formation region P'1 formed on the back surface of the substrate as seen from the substrate back side.

FIG. 4b shows the united form of block P4, indicating hole A, flat plane B, and slope C for one block P4. The flat plane B is at a position corresponding to the back surface of the noneffective surface 1c, and the slope C is at a position corresponding to the back surface of the effective surface 1a.

Figure 5A:
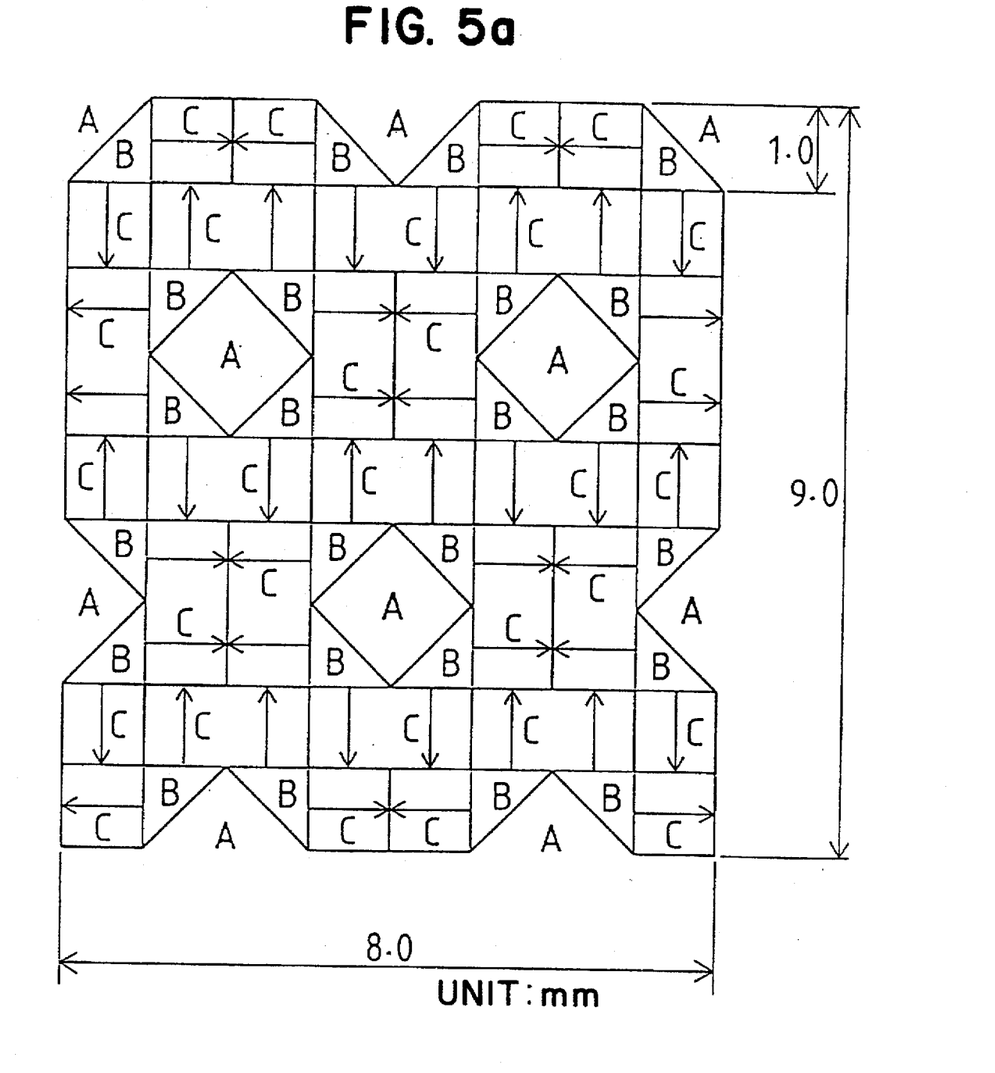

FIG. 5a symbolizes the undulated pattern of the polarization conversion unit formation region shown in FIG. 4b about this embodiment. Symbols A, B and C represent the hole, flat plane and slope, respectively, the same as in FIG. 4b. In the slope C, the direction of slope is indicated by using arrow. The direction of arrow is, as shown in FIG. 5b, from the ridge portion projecting to the back surface side of the polarization converter P to the substrate region Q1.

The indicated numerical value shows an example of dimensions (unit: mm) when manufacturing the polarization converter by injection molding using transparent plastic materials.

Figure 5B:
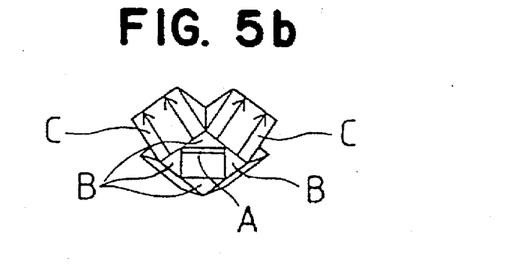

FIG. 8 shows the undulated pattern of the back surface of the polarization converter in a modified type of the embodiment shown in FIGS. 4a to 5b, of which notation is same as in FIGS. 5a and 5b. What this embodiment differs from the embodiment shown in FIGS. 4a to 5b lies only in the layout pattern of united blocks each consisting of four polarization conversion units.

This coupling pattern corresponds to the block unit row of coupling pattern in FIG. 5a dislocated by a half block pitch. In both embodiments, it seems most advantageous to unite the entire polarization converter into one body by using a same optical material (in particular, transparent plastic material).

By applying the injection molding technology, the shape and dimensions of the undulated patter may be freely selected by the shape of the die to be used.

In any undulated pattern, the light incident and exit surfaces of each polarization conversion unit (corresponding to surfaces 1a to 1c) are on a same plane, and therefore, as shown in FIG. 4a, when a linear polarized light flux L enters vertically to the extending direction in the polarization converter P, it is emitted as a light flux L' converted in polarization direction by 90° in the U-turn route of substrate→polarization conversion unit→substrate.

Figure 7A:
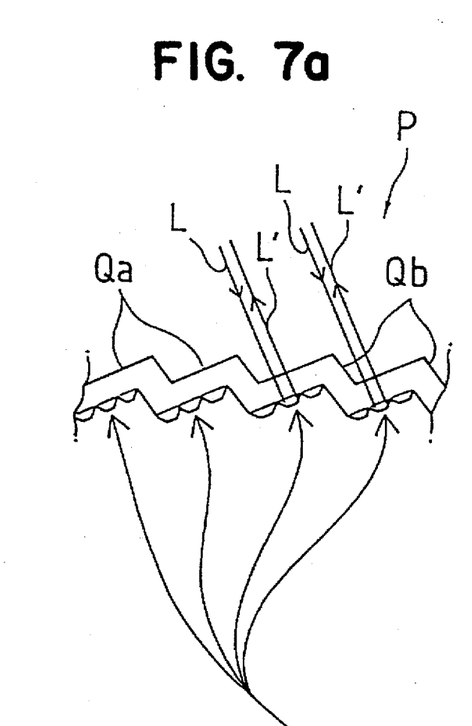
In FIG. 7a is shown an example forming repetitive slopes on both sides of the substrate region.
Figure 7B:
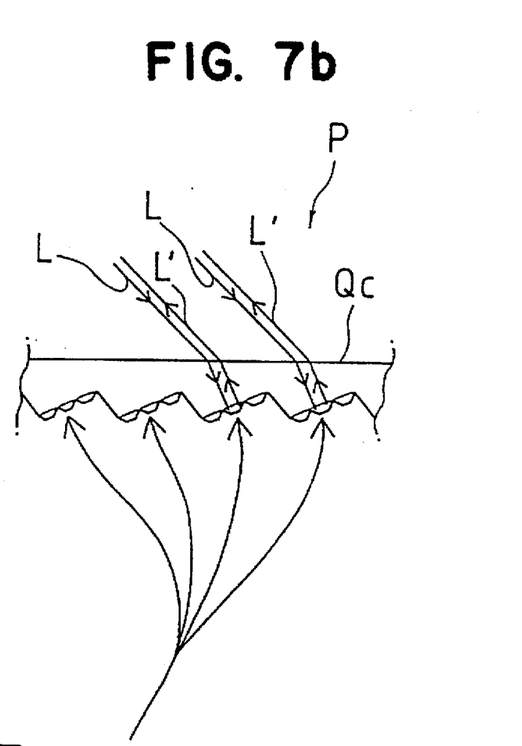
In FIG. 7b is shown an example forming repetitive slopes only on the back surface side, and in FIG. 7c is shown the undulated shape pattern of the polarization conversion unit formation region formed therein.

FIGS. 7a and 7b show two embodiments in which the light incident and exit directions may be taken in directions inclined to the extending direction of the polarization converter. In these embodiments, since the light incident and exit angles are in directions inclined to the extending direction of the polarization converter, the shape of the both sides or back side (the side coupled with the polarization conversion unit optically and mechanically) of the substrate region has a repetitive slope.

In FIG. 7a, the both sides of the substrate region are repetitive slopes, and the slope Qa functioning as light incident and exit surfaces and slope Qb substantially not functioning as light incident and exit surfaces are alternately formed on the surface side of the substrate region, and the boundary surface of the back side with the polarization conversion unit formation region has the same shape as the surface side. On the inclined boundary surface, an undulated shape pattern as shown in FIG. 7c is formed.

Figure 6:
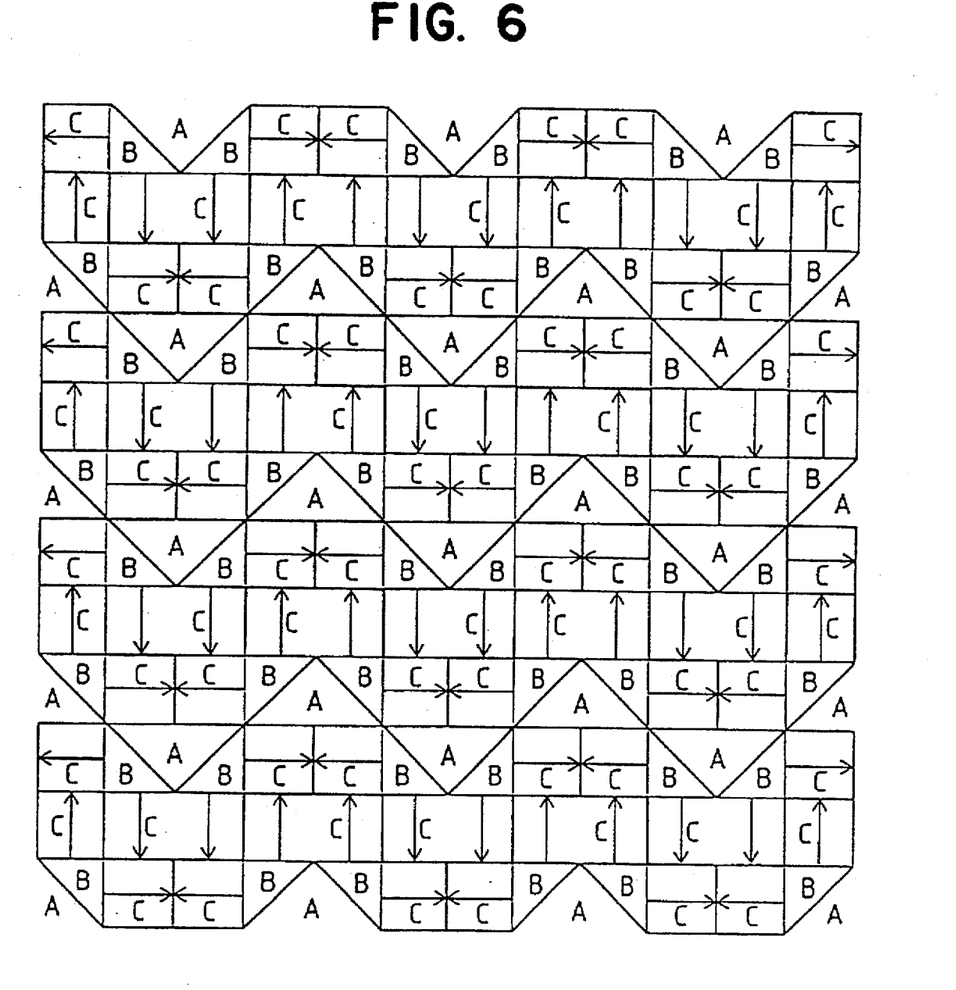
FIG. 6 shows the undulated pattern on the back side of the polarization converter in a modified type of the embodiment shown in FIGS. 4a to 5b, expressed in the same notation as in FIGS. 5a and 5b.
Figure 7C:
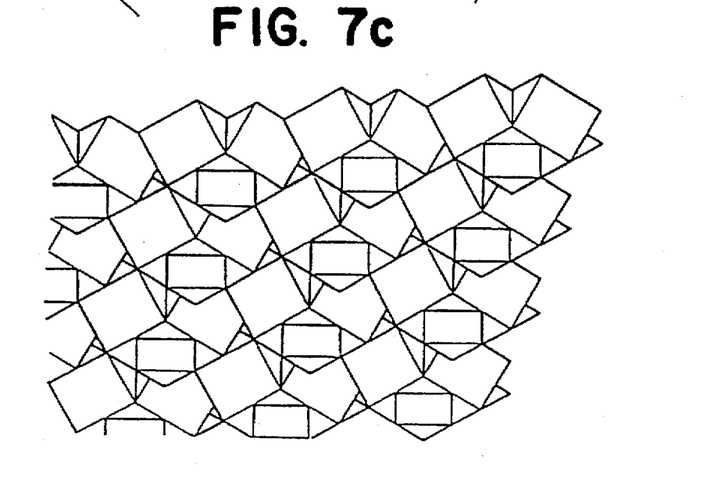

The drawing in FIG. 7c shows the undulated shape pattern of the polarization conversion unit formation region as seen from the back side of the polarization converter P, same as in FIGS. 4a to 6. As the type of the undulated pattern, the example shown in FIGS. 4a to 5b is given, but it may be also replaced with the type shown in FIG. 8. Or, united blocks of four units shown in FIG. 3b may be also formed in multiple rows.

In any case, the boundary surface (inclined to the extending direction of the polarization converter P) of the polarization conversion unit formation region and substrate region is not particularly defined as far as optical and mechanical coupling of the two is achieved, but same as in the foregoing embodiments, it is the most practical method to unite the entire polarization converter integrally by injection molding from the viewpoint of achieving the optical and mechanical coupling automatically.

The inclination angle of the repetitive slopes is determined in design by the incident and exit directions of the light (ray or light flux) handled by the polarization converter P. That is, in the embodiment shown in FIG. 7a, an optimum relation is that the slope Qa is vertical to the propagation direction of the incident light L, and that the slope Qb is parallel to the propagation direction of the incident light L. In this condition, it is possible to enter the incident light L vertically on each effective surface efficiently in the polarization conversion unit formation region.

The light entering each effective surface in the polarization conversion unit formation region, that is, the surfaces corresponding to surfaces 1a, 1b in FIG. 1 undergoes the polarization conversion action mentioned above, and is emitted from the polarization converter P as ray L'.

On the other hand, FIG. 7b shows an embodiment of forming the substrate region only on the back side. In this case, the incident light L and exit light L' undergo deflection action depending on the refractive index difference against the air on the substrate region surface side Qc. Therefore, considering the back side (the boundary with the polarization conversion unit formation region) in the condition of the same inclination angle as in FIG. 7a, it is known that the polarization conversion action acts effectively on the light L entering at a large incident angle to the extending direction of the polarization converter P.

As the undulated pattern of the polarization conversion unit formation region, same as in FIG. 7a, there is no particular limitation, and the type shown in FIGS. 4a to 5b, the type shown in FIG. 6, or the type of united block of four units shown in FIG. 3b may be employed.

To keep optical and mechanical coupling on the boundary surface between the polarization conversion unit formation region and substrate region, the same as in the foregoing embodiments, it is the most practical method to form the entire polarization converter integrally by injection molding.

Various embodiments are described so far, but the polarization converter of the invention is not limited to these embodiments only. A basic feature of the invention lies in the use of the polarization conversion action possessed by the polarization conversion unit in the type shown in FIG. 1. Therefore, as far as the polarization converter is composed by using this polarization conversion unit either alone or in combination, it falls within the scope of technical concept of the invention.

As the method of optically and mechanically coupling the substrate region to the polarization conversion unit formation region, aside from the injection molding mentioned above, various means many be employed, such as adhesion by using transparent adhesive, and fixing the two disposed tightly with frame member, among others.

The polarization converter of the invention is free from particular limitations of the polarization direction of incident light or wavelength dependence, unlike conventional phase difference plates, and it is also wide in the degree of freedom for selection of materials for composing the device and is excellent in economy.

Moreover, in the form of arraying the polarization conversion units or their united blocks in plural rows, a thin polarization converter exhibiting a polarization conversion action on light flux with a large sectional area is obtained. Further saying, in the form of inclining the array plane of the polarization conversion units or their united blocks to the extending direction of the substrate region portion, a polarization converter having the polarization conversion function on the light entering from an oblique direction to the extending direction of the polarization converter may be also achieved.

What is claimed is:

1. A polarization converter comprising:
a compound prism body having three sequentially united columnar volume regions respectively having right-angled isosceles triangular cross-sections, the sides of the columnar volume regions forming the hypotenuses of the triangular cross sections being outer sides of the compound prism body, each columnar volume region having a column axis such that the three column axes extend in three mutually orthogonal directions,
the compound prism body converting polarity and reversing a propagation direction of light introduced to the compound prism body by transmitting light through the compound prism body and sequentially reflecting the light at the sides forming the hypotenuses of the triangular cross-sections.

2. A polarization converter comprising:
at least one compound prism body having three sequentially united columnar volume regions respectively having right-angled isosceles triangular cross sections, the sides of the volume regions forming the hypotenuses of the triangular cross sections being outer sides of the at least one compound prism body, each columnar volume region having a column axis such that the three column axes extend in three mutually orthogonal directions,
the at least one compound prism body converting polarity and reversing a propagation direction of light introduced to the at least one compound prism body by transmitting light through the at least one compound prism body and sequentially reflecting the light at the sides forming the hypotenuses of the triangular cross-sections; and
a substrate region made of optical material, the substrate region being mechanically and optically coupled with at least one compound prism body.

3. A polarization converter comprising a compound prism region in one body shape coupling parallel a plurality of unit volume regions, of which unit volume region is a volume region having one body shape sequentially uniting three triangular columnar volume region elements having both ends in right-angled isosceles triangular form so that axial directions of triangular columns corresponding to said elements respectively may be directed in three mutually orthogonal directions.

4. A polarization converter comprising at least one compound prism region in one body shape coupling parallel a plurality of unit volume regions, of which unit volume region is a volume region having one body shape sequentially uniting three triangular columnar volume region elements having both ends in right-angled isosceles triangular form so that axial directions of triangular columns corresponding to said elements respectively may be directed in three mutually orthogonal directions, and a substrate region made of optical material coupled with said at least one compound prism region optically and mechanically.

5. A polarization converter comprising multiple volume regions having one body shape sequentially uniting three triangular columnar volume region elements having both ends in right-angled isosceles triangular form so that axial directions of triangular columns corresponding to said elements respectively may be directed in three mutually orthogonal directions, or multiple compound prism regions having one body shape parallel coupling a plurality of such volume regions, in a shape distributed and arrayed on the repetitive slope on one of the surface and back sides of a substrate region made of an optical material forming repetitive slopes on both surface and back sides, wherein the arrayed compound prism regions are coupled with the substrate region optically and mechanically.

6. A polarization converter comprising multiple volume regions having one body shape sequentially uniting three triangular columnar volume region elements having both ends in right-angled isosceles triangular form so that axial directions of triangular columns corresponding to said elements respectively may be directed in three mutually orthogonal directions, or multiple compound prism regions having one body shape parallel coupling a plurality of such volume regions, in a shape distributed and arrayed on the repetitive slope on one of the surface and back sides of a substrate region made of an optical material forming repetitive slopes on one side of surface and back sides and a flat plane on the other side, wherein the arrayed compound prism regions are coupled with the substrate region optically and mechanically.

7. A polarization converter according to claim 1, wherein each of the three united columnar volume regions has first and second sides respectively forming legs of the respective triangular cross-section, the three volume regions include an inner volume region and two outer volume regions united to the inner volume region such that the first sides of the outer volume regions are united respectively to the first and second sides of the inner volume region, the inner volume region has opposing first and second triangular ends, the second sides of the outer volume regions lie in a plane together with the first triangular end of the inner volume region, and at least one of the first and second triangular ends of the inner volume region has a reflective film formed thereon.

8. A polarization converter according to claim 2, wherein each of the three united columnar volume regions has first and second sides respectively forming legs of the respective triangular cross-section, the three volume regions include an inner volume region and two outer volume regions united to the inner volume region such that the first sides of the outer volume regions are united respective to the first and second sides of the inner volume region, the inner volume region has opposing first and second triangular ends, the second ends of the outer volume regions lie in a coupling plane together with the first triangular end of the inner volume region, and the substrate is mechanically and optically coupled with the at least one prism body at the coupling plane.

9. A polarization converter according to claim 2, wherein a plurality of compound prism bodies are provided.

10. A polarization converter according to claim 9, wherein the substrate region is coupled with a plurality of compound prism bodies.

11. A polarization converter according to claim 2, wherein the at least one compound prism body and the substrate region are formed of the same material.

\* \* \* \* \*